(12) United States Patent
Zwijack (10) Patent No.: US 9,560,860 B2
(45) Date of Patent: Feb. 7, 2017

(54) APPARATUS AND METHOD FOR DECONTAMINATING GRAIN

(71) Applicant: Tim Zwijack, Camdenton, MO (US)

(72) Inventor: Tim Zwijack, Camdenton, MO (US)

(*) Notice: Subject to any disclaimer, the term of this patent is extended or adjusted under 35 U.S.C. 154(b) by 0 days.

(21) Appl. No.: 14/713,383

(22) Filed: May 15, 2015

(65) Prior Publication Data

US 2015/0327562 A1 Nov. 19, 2015

Related U.S. Application Data

(60) Provisional application No. 61/993,375, filed on May 15, 2014.

(51) Int. Cl.
| | | |
|---|---|---|
| *A61L 2/00* | (2006.01) | |
| *A61L 9/00* | (2006.01) | |
| *A01M 13/00* | (2006.01) | |
| *A23B 9/22* | (2006.01) | |
| *A23L 3/3409* | (2006.01) | |

(52) U.S. Cl.
CPC ............... *A23B 9/22* (2013.01); *A23L 3/34095* (2013.01); *A23V 2002/00* (2013.01)

(58) Field of Classification Search
CPC ......... A23B 9/22; A23L 3/34095; A23K 3/00; A23V 2002/00; A61L 2/00; A61L 2/202

USPC ............................. 422/1, 28, 32, 305; 43/125
See application file for complete search history.

(56) References Cited

U.S. PATENT DOCUMENTS

| | | | |
|---|---|---|---|
| 3,685,431 | A | 8/1972 | Stone |
| 4,549,477 | A | 10/1985 | McCabe |
| 6,171,625 | B1 | 1/2001 | Denvir |
| 2003/0037684 | A1 | 2/2003 | Yvin |
| 2009/0094853 | A1* | 4/2009 | Noyes ................... F26B 17/122 34/233 |

OTHER PUBLICATIONS

PCT, Notification of Transmittal of the International Search Report and the Written Opinion of the International Searching Authority, or the Declaration, in International Application No. PCT/US15/30953, dated Dec. 14,2015 (16 pages).

* cited by examiner

*Primary Examiner* — Monzer R Chorbaji
(74) *Attorney, Agent, or Firm* — McAndrews, Held & Malloy, Ltd.

(57) ABSTRACT

Disclosed is an apparatus for decontaminating grain with ozone, where the apparatus includes a grain inlet, a decontamination chamber that includes a plurality of baffles and a plurality of ozone ports; and a grain outlet. Also disclosed is a method for decontaminating grain that includes contacting a gravity assisted or gravity driven flow of grain with ozone.

17 Claims, 9 Drawing Sheets

FIG. 3D

APPARATUS AND METHOD FOR DECONTAMINATING GRAIN

CROSS REFERENCE TO RELATED APPLICATION

This application claims the benefit of priority to U.S. Provisional Patent Application No. 61/993,375, which was filed May 15, 2014, and which is incorporated herein by reference in its entirety.

FIELD

The disclosure relates to food products and animal feeds, particularly to apparatuses and related methods for decontaminating grain products including food products for human consumption and products for animal feed.

BACKGROUND

It has been estimated that annual losses of stored grain damaged by insect infestation, heat, molds, fungi (mycotoxins), and bacteria are approximately equal to the annual grain loss arising from crop pests during the growing season. A 1990 survey conducted in the U.S. estimated the stored grain losses for the year to be over $500 million. Typically about 5-10% of the world's food production is estimated to be lost each year because of direct or indirect insect damage to stored grain supplies. The increasing world population places an ever-increasing strain on the world supply and production of foodstuffs, and as such, increases the urgency to identify and implement processes that can reduce or mitigate losses of stored food supplies, such as stored grains.

Efforts to increase education and awareness of proper management and maintenance of stored grain supplies may help to slow or reduce annual grain losses. For example, activities such as regular cleaning and repair of grain storage bins and processing equipment, using residual insecticides in storage areas prior to storing grain, properly cleaning and drying grain prior to storage, proper aeration of stored grain, and regular inspection of the stored grain can help prevent and control damage to stored grain. Nevertheless, these activities may not be sufficient on their own to mitigate loss and so, in addition to these activities, a number of fumigation methods have been developed. Older fumigation methods treat stored grain through the application of toxic chemicals such as phosphine and methyl bromide to the stored grain. While such methods can kill insects, they may not be effective in treating mold, fungus, and some bacteria, and they may present a health risk to people who may come in contact with the chemical agents. Furthermore, since the ratification of the 1987 Montreal Protocol, an international treaty designed to phase out substances identified as having a role in ozone depletion, methyl bromide is no longer available for use.

Ozone has been shown to be an alternative to the more toxic chemical fumigants in treating grain for fungus, mold, bacteria, and insects. Some methods for grain decontamination that incorporate ozone may seek to expose the grain to a high concentration of ozone for an extended period of time, and may incorporate fans or air movement systems. Other methods utilize a conveyor belt to pass grain through an atmosphere containing ozone. Some of these methods provide a treated product that is not compromised in safety, quality, or taste; however the ozonation methods may be slow and may have a limited ability to decontaminate large volumes of grain in a reasonable amount of time.

The present disclosure provides an apparatus and related methods that comprise a pressurized ozone chamber that can decontaminate grain in less time with increased exposure rate and increased capacity to move large volumes of grain through the decontamination treatment.

SUMMARY

In an aspect the disclosure, provides an ozonation system comprising a grain inlet configured to accept an amount of grain; a decontamination chamber connected to the grain inlet and comprising a plurality of baffles that are each configured to divert a gravity driven flow-path of grain flowing from the grain inlet into and through the ozonation system; and a plurality of ozone ports that are each configured to provide ozone to the decontamination chamber; and a grain outlet.

In embodiments of this aspect, the ozonation system can further comprise an ozone generator that is in connection with the plurality of ozone ports. In further embodiments, the ozonation system can further comprise an ozone chamber that is in connection with the plurality of ozone ports and the ozone generator.

In some embodiments, the plurality of baffles and the plurality of ozone ports are present in a ratio of about 1:1, or are present in a ratio of 1:1. In further embodiments, the location of each of the plurality of ozone ports and each of the plurality of baffles are configured such that one ozone port is located underneath one baffle, and such that the ozone port is not in a direct flow path of grain moving through the decontamination chamber. In some embodiments, at least some of the plurality of baffles comprise an inverted-V shape, with respect to the bottom of the decontamination chamber and have a baffle angle.

In further embodiments of this aspect, the ozonation system can further comprise one or more additional features comprising an ozone detector, an ozone recycling system, or a fan or directional blower.

In another aspect, the disclosure relates to a method for decontaminating grain, the method comprising: introducing grain into a decontamination zone comprising ozone; and reacting grain with ozone in the decontamination zone; wherein the amount of ozone in the decontamination zone is effective to decontaminate the grain, and wherein the grain moves through the decontamination zone atmosphere in a gravity-driven flow path. In embodiments of this aspect, the method can comprise an ozonation system as herein described.

In further embodiments of this aspect, the method can further comprise one or more steps including a pretreatment step, a packaging step, a step of monitoring the concentration of ozone, an ozone recovery step, or an ozone recycling step.

The disclosure provides for other aspects and embodiments that will be apparent to one of skill in the art in light of the following description.

BRIEF DESCRIPTION OF DRAWING

FIGS. 1A-1D depict different views of a non-limiting embodiment of an ozonation system 100, encompassed by the disclosure.

1A-1B. The view illustrates the arrangement of the flow chamber 170 and the ozone chamber 160 in this embodiment of ozonation system 100.

FIG. 2A-2F.

FIG. 3A-3D.

DETAILED DESCRIPTION

In a general sense, the disclosure relates to an apparatus that is useful for the decontamination of grains and related methods for decontaminating grains that incorporate the apparatus. The inventor has designed an apparatus (ozonation system) that utilizes ozone to decontaminate grain that moves through the apparatus in a flow path that is promoted, assisted, or driven by gravity. The grain that exits the apparatus may be substantially decontaminated and ready for additional processing steps, or it can be packaged for sale as a food product or animal feedlot. The apparatus has a number of advantages relative to existing decontamination methods and systems including, for example, cost savings arising from reduced liability arising from product contamination, reduced need for lot testing, fewer production and processing delays, faster compliance with regulatory agencies, reduced livestock illness from contaminated feeds, reduced costs associated with livestock antibiotics, and also avoids drawbacks associated with chemical fumigants. While the apparatus design is scalable, the design of the apparatus also allows for a plurality of apparatuses to be used together in order to decontaminate large amounts of grain in a shortened period of time. Accordingly, the apparatus and methods disclosed herein provide decontaminated grain and significantly improve upon the existing systems and methods that are used to decontaminate grain and grain products.

One particular advantage provided by the apparatus and methods disclosed herein is that they can provide for a more effectively decontaminated grain in a reduced amount of time relative to existing systems and methods, including those that utilize ozone as the decontaminating active agent. Accordingly, the apparatus and method described herein represent an attractive alternative other systems and methods that are currently used to decontaminate grain, including those that currently utilize ozone as a decontaminating agent.

Ozone is a well-known and characterized inorganic compound, which is a less-stable allotrope of oxygen relative to diatomic oxygen. It has a density greater than air (2.144 mg/cm$^3$ compared to 1.2754 mg/cm$^3$ at 0° C.) and a sharp odor reminiscent of bleach that can be detected by humans in amounts of about 0.01 µmol/mol ($O_3$/air). Ozone is a powerful oxidant and has been used in a variety of industrial oxidation processes. Due to its reactivity and potential for explosive decomposition, ozone is typically used in low concentrations for commercial processes. Further, a number of safety and health administrations have established permissible exposure limits for workers, and as such, appropriate cautions should be taken when practicing the various aspects and embodiments disclosed herein.

The ozone source used in connection with the disclosure can be supplied by any generator or method known in the art. Typically, because ozone rapidly decays to diatomic oxygen and cannot be stored or transported like some other industrial gasses, ozone needs to be generated on-site. Various commercially available ozone generators may be used with the ozonation system and methods disclosed herein. Ozone generators vary in the arrangement and design of the various components such as, for example, high-voltage electrodes. Embodiments of the ozonation system and method described herein allow for adjustment of ozone production and/or generator settings as may be required by the particular production capacity. Further, it may be possible to supply any specifically required power demands, water supplies, gas supplies (e.g., oxygen source) and the like, that various commercially available ozone generators may require. Other commercially available ozone generators and generation methods may include, for example, "hot spark" corona discharge, UV light, cold plasma, or electrolytic methods.

Due to the reactivity of ozone, features and elements of the ozonation system described herein may be manufactured with one or more materials that are resistant to oxidation, including, for example, stainless steel (for example, quality 316L), titanium, moisture-free aluminum, glass, polytetrafluoroethylene (PTFE), injection-molded plastics, and polyvinylidene fluoride (PVF). When handling ozone concentrations below about 1% (by weight), silicone rubber may also be used.

The aspects and embodiments disclosed herein relate generally to grain processing and grain decontamination. The term "grain" and "grain product" should be recognized to encompass grain in any form including raw grain, freshly harvested grain, dried grain, stored grain, processed grain (bleached, milled, husked, hulled, etc.), as well as any portion of grain, including processed forms of grain (husk, hull, germ, shell, starch, bran, etc.). Grains may also include small, hard, dry seeds (typically without attached any fruit layer) that may include high-end seeds that are harvested for use in human or animal food products or agricultural food production. Grains commonly are produced by grain crops, which include cereal grains as well as beans and soybeans. Non-limiting examples of grains include corn (maize), rice, wheat, millet, fonio, sorghum, barley, oats, rye, teff, triticale, wild rice, amaranth, buckwheat, quinoa, legumes (e.g., chickpeas/garbonzo beans, common beans (*Phaseolus vulgaris* varieties including navy, kidney, black, wax beans), peas, fava beans, lentils, lima beans, lupins, mung beans, peanuts, pigeon peas, runner beans, and soybeans), safflower seeds, sunflower seeds, flax seed, hemp seed, poppy seed, rapeseed, and mustard seed. In some embodiments, the grain can be selected from corn, wheat, rice, wild rice, barley, oats, rye, and soybeans. The grain that is added to the ozonation system may be in the form of a dry, flowable product.

It should be appreciated that all numerical ranges disclosed herein are intended to include any particular number within that range as well as sub-ranges that fall within the scope of the broader range. For example, a range of 0.01% to 5.0% will be understood to also encompass ranges falling at or above 0.01% and at or below 5.0% (e.g., 3.7%, 1.0%, 0.02%-0.04%, 0.02%-4.5%, 0.05%-4.08%, or 0.03%-1.0%, etc.). These are just examples of the types of numbers and ranges that would be encompassed.

All references cited herein are incorporated by reference in their entirety for all purposes.

Ozonation System

In one aspect the disclosure relates to a system that can be used to decontaminate grain and grain products. Generally, the apparatus incorporates an ozone supply such that the environment within the apparatus (or alternatively "ozonation system") maintains a high concentration (or partial pressure) of ozone relative to prevailing atmospheric conditions and amounts. As discussed in further detail below, the amount of ozone within the ozonation system can be adjusted but is suitably maintained in an amount that is effective to decontaminate grain or grain products that pass through the ozonation system. As the amount of ozone can be modulated and adjusted, the ozonation system and associated methods may comprise an amount of ozone that is not hazardous to animals (e.g., mammals such as humans and livestock) and/or plants (e.g., crops), while also being effective to decontaminate grain (e.g., kill insects, molds, fungi, oxidize mycotoxins, etc.). The ozonation system may be oriented in a vertical orientation with respect to the direction of the grain movement through the unit, for example perpendicular of substantially perpendicular (from about 60-90 degrees) to the ground. The movement and flow of the grain is driven or assisted by gravity and may also be adjusted and directed through the use of features such as directional blowers (e.g., fans, directional jets, or airstreams, etc.) that may be incorporated and used to modify the amount of time the grain resides within the ozone atmosphere (e.g., delay or expedite movement of the grain relative to the gravity-driven speed). As described below, the features and design of the ozonation system disclosed herein may provide a more efficient way to decontaminate grain relative to prior methods that utilize ozone for the decontamination of grain such as, for example, forced ozone movement through a static grain volume, holding a static grain volume in a static ozone atmosphere, or passing grain on a conveyer through an atmosphere containing ozone.

Figure 1A:
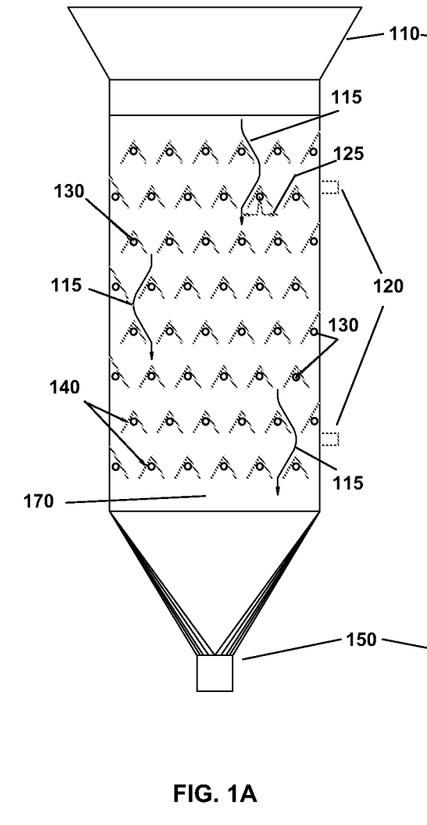
FIG. 1A illustrates a front view of the ozonation system 100.

The unit comprises a grain inlet (e.g., a grain hopper), a plurality of internal baffles, a plurality of ozone ports, and one or more outlets. The unit may also be provided with a source of ozone. Referring to the illustrative embodiment presented in FIGS. 1A and 1B, which depict the general internal and external features of an ozonation system (100) in "front" and "side" views, respectively, the top of the unit (100) comprises a grain inlet or hopper (110) which may comprise a funnel-like geometry to assist or ease the feeding of grain to the unit. From the hopper (110), the grain moves into the top portion of the decontamination chamber (170), which comprises a plurality of baffles (140) and a plurality of ozone ports (130). The plurality of ozone ports (130) are in communication (e.g., fluidic communication) with an ozone source which, in the embodiment depicted in FIGS. 1A and 1B, can be an ozone chamber (160) that abuts and is adjacent to the decontamination chamber (170). Both the ozone chamber (160) and the decontamination chamber (170) are substantially closed except for the connections to the grain inlet (110) and grain outlet (150). As shown in the embodiment in the Figures, the ozone chamber (160) can include one or more ozone supply inlets (120) that provide ozone to the chamber (160) from an ozone source (not shown). As the grain enters the decontamination chamber (170), its flow path (115) is diverted by the plurality of baffles (140), which cause the grain to bounce and/or tumble on the baffles and flow as a cascade or curtain over the edge of the baffles. The grain is contacted and reacts with the ozone provided through the plurality of ozone ports (130) in the decontamination chamber during the tumbling on the plurality of baffles (140) as well as during the cascading flow over the baffle edge. In some embodiments, the baffles are sized to span the decontamination chamber (from front to back (see, FIG. 1B)), which creates an ozone flow path (125) that is directed from the ozone ports (130) under the baffles (140) out toward the edge of the baffles and into the cascading flow of grain. This action provides for a contacting and reacting time of the grain with the ozone that is more efficient that existing methods, as a substantially larger surface area of the grain is kept in contact with the ozone environment, substantially killing and removing any pests (e.g., insects) or contaminants (e.g., fungi, molds, mycotoxins, etc.) that may be present in or on the grain. Once the grain flow path (115) reaches the bottom of the decontamination chamber (170), the grain is substantially decontaminated, and exits the unit through a grain outlet (150), which can direct the decontaminated grain for its end use such as, for example, into packaging for use in human food products or as animal feedstock supply.

Figure 3A:
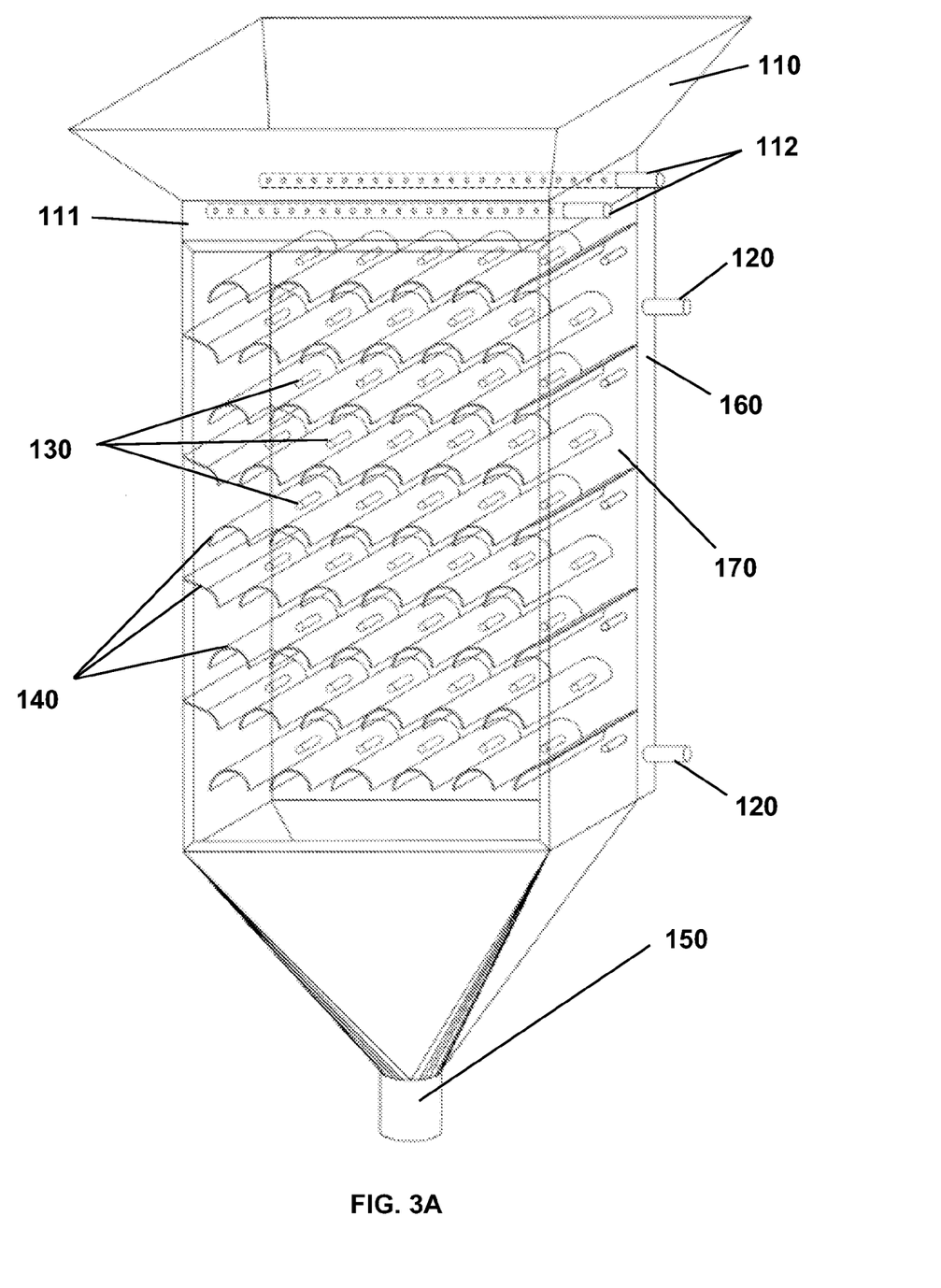
FIGS. 3A-3C depict perspective views of non-limiting embodiment of ozonation systems that include alternative ozone port 130 and baffle 140 arrangements and optional ozone insert.
Figure 3B:
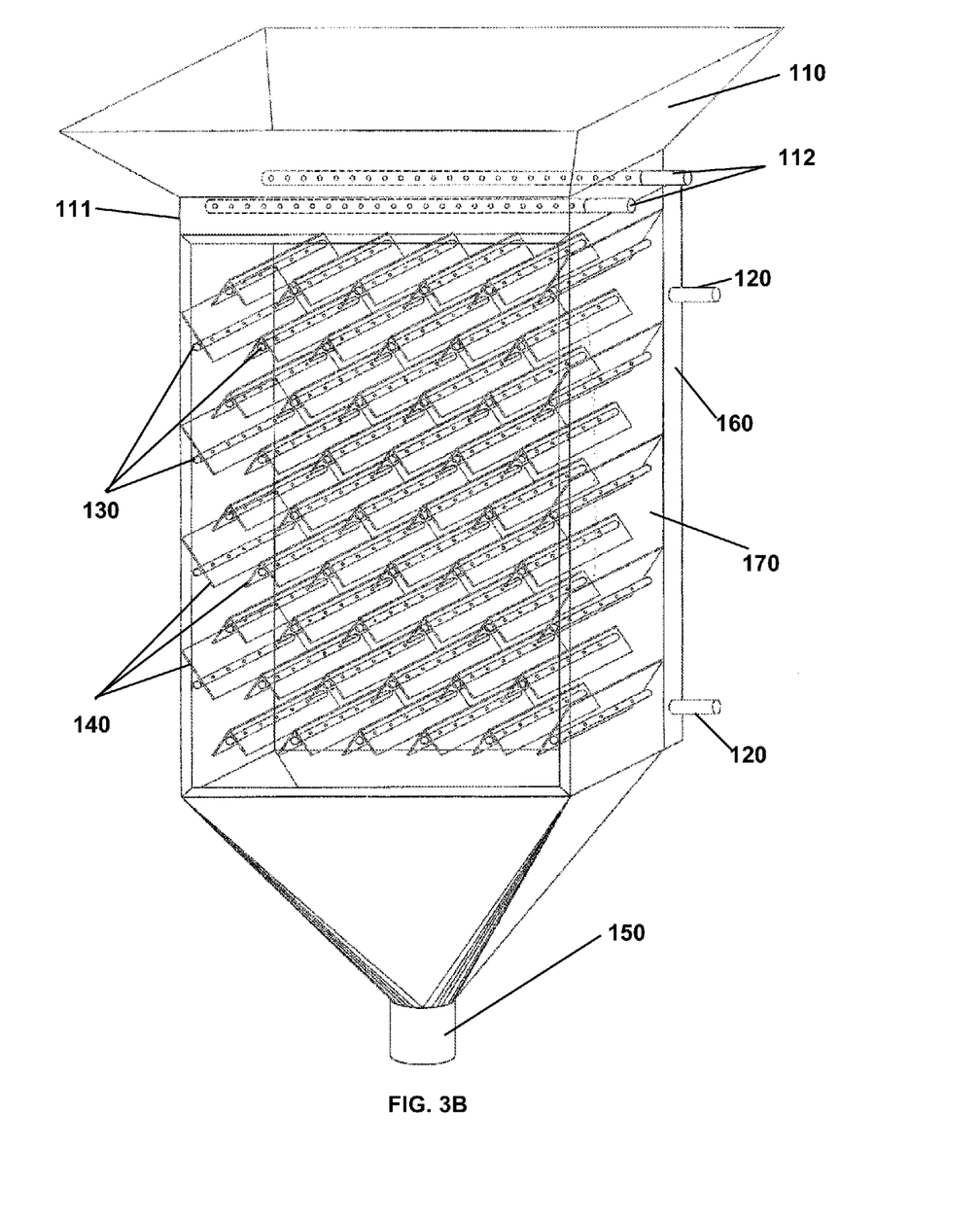
Figure 3C:
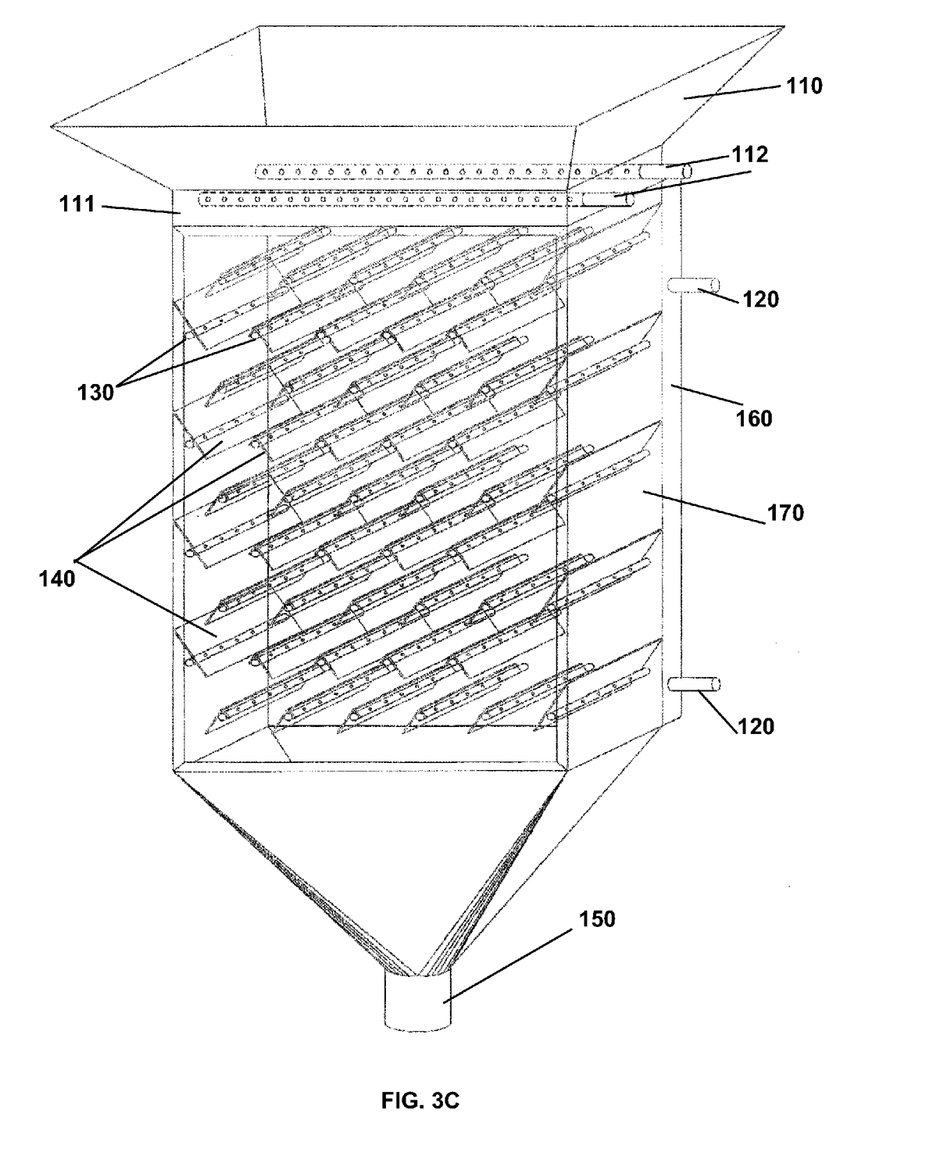
Figure 3D:
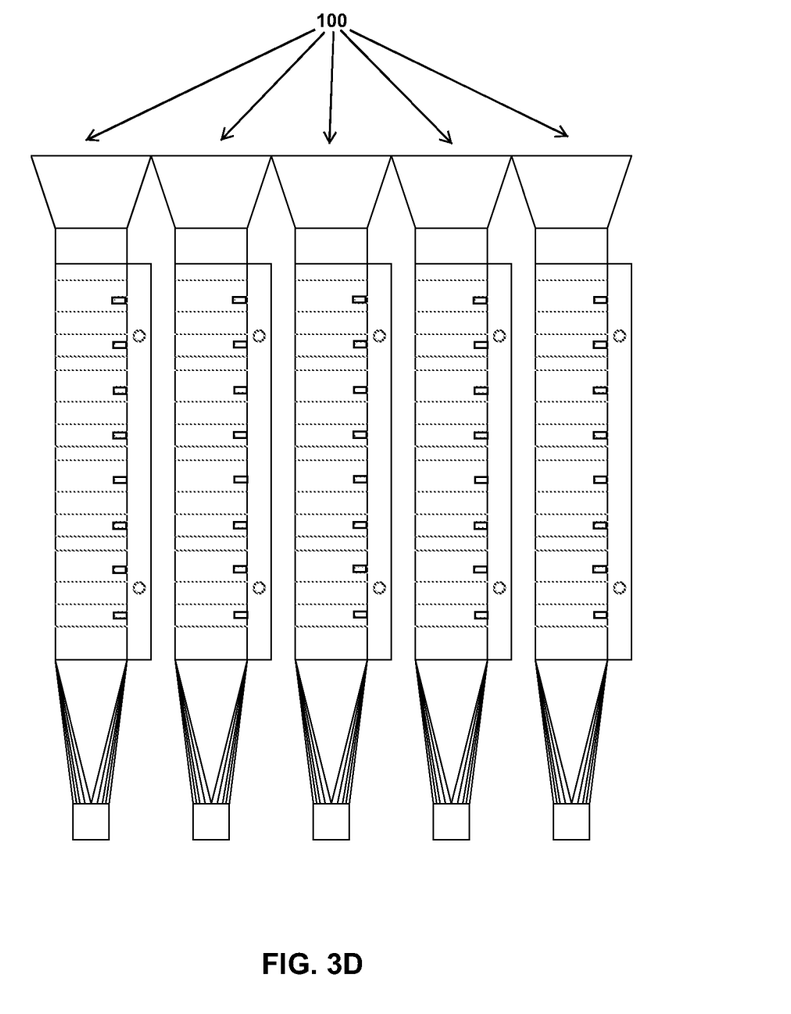
FIG. 3D depicts one embodiment that incorporates a plurality of the ozonation systems 100 that are described herein.

The size and shape of the ozonation system (100) is scalable, and can be adapted for any particular intended use or need. While the design of the unit may be designed with a general box shape, the unit can be designed to have other external geometries, such as oval and circular, triangular, pentagonal, hexagonal, heptagonal, octagonal, nonagonal, decagonal, and the like. Similarly the height, width, and depth dimensions of the unit can be adjusted based on the demands and needs of the grain processing volumes of a given location. In some embodiments, the ozonation system may be constructed in one or more stock capacity sizes (e.g., having a capacity to run a particular tonnage of grain per hour). In such embodiments, and referring to FIG. 3D, a plurality of ozonation systems (100) can be assembled in an array in order to meet large processing needs, or to expedite the decontamination process. While FIG. 3D depicts the plurality of units (100) in a parallel arrangement, it is also contemplated that two or more units can be arranged in series, such that the grain outlet (150) from one unit is directed into the grain inlet hopper (110) of a second unit (not pictured). Such an arrangement can be used for larger numbers (more than 2) of ozonation systems.

As shown in the Figures, the unit comprises a grain inlet or hopper (110). Like the ozonation system (100), the grain hopper feature (110) can be designed to have any suitable dimension and general geometric shape and cross-section. In some embodiments it may be advantageous to utilize and retrofit an existing grain inlet or grain hopper to the top of the unit. In some embodiments, the inlet hopper generally comprises dimensions which allows for a large target area at the top of the hopper, into which the grain is fed such that overflow and spilling of grain is minimized. Toward the bottom of the hopper, the cross-sectional area reduces in size relative to the general dimension of the top of the decontamination chamber (170), creating a funnel toward the grain outlet (150).

As discussed herein, the general dimensions of the ozonation system can vary based on standard specifications of particular components and/or be custom built based on considerations including, for example, the desired capacity of the unit and the type of grain to be processed. Thus, the units are scalable and customizable. FIG. 10 illustrates one non-limiting embodiment of unit dimensions that can provide for adequate decontamination and processing speed (e.g., residence/exposure time, exposure of grain to ozone, volume of grain to be processed). In the embodiment depicted in FIG. 10, the dimensions of various elements are identified in inches and so the general dimension of the illustrative unit includes a width of about 3 feet, a height of about 5 and a half feet, and a depth of about 1 foot, not including the inlet hopper portion (shown as about 22×48 inches) or the funnel outlet portion. FIG. 10 also depicts an embodiment that comprises an optional door panel (113) that can provide direct access to the interior of the decontamination chamber.

The ozonation system comprises a decontamination chamber ((170), alternatively, called a grain flow chamber). As discussed above, decontamination chamber (170) receives grain from the grain inlet/hopper (110) and during use maintains an atmosphere comprising an amount of ozone that is effective to decontaminate grain as it flows down through the chamber. In one embodiment, the ozonation system can further comprise an ozone insert portion (111) that can be located between the hopper and the decontamination chamber. See, e.g., FIG. 10. In such embodiments, an ozone insert portion can provide for a pretreatment of the grain with an amount of ozone that is provided by at least one ozone port (112) that is associated with the ozone insert portion (111). FIG. 10 depicts an embodiment wherein the ozone insert portion comprises two ozone ports. The size (length, width, geometry) of at least one ozone port can vary from between the entire length of the ozone insert portion to flush with the wall of the ozone insert portion. In embodiments, the at least one ozone port spans the entire length of the ozone insert portion and comprises one or a plurality of openings through which the ozone can flow and contact grain. See, also FIGS. 3A-3C depicting other non-limiting embodiments of the ozone insert portion and ozone port(s). The flow of ozone to the ozone port(s) can be adjusted based on the type of grain that is to be decontaminated (e.g., lower flow rate for lighter grain, higher flow rate for heavier grain). In some embodiments the flow rate can be adjusted to slow the rate at which the grain enters the decontamination chamber. In some embodiments, the flow rate can be adjusted to reverse the rate of deflection flow of the grain in the decontamination chamber.

The decontamination chamber comprises a plurality of ozone ports (130) and a plurality of baffles (140). As discussed above, the ozone ports (130) provide an amount of ozone to the decontamination chamber that is effective to decontaminate the grain, and the baffles impede and direct the flow of the grain through the unit such that the entire surface of the grain is contacted and reacts with the ozone. As discussed herein, in embodiments wherein the plurality of ozone ports and baffles are arranged in a pattern comprising rows and/or a grid, the alternating rows (moving from the top of the chamber to the bottom of the chamber) may be offset in order to encourage grain deflection action on the baffles (e.g., generating a flowpath that generally cascades toward the outlet) During operation, the pressure in decontamination chamber may be maintained at least slightly above atmospheric pressure (i.e., it is pressurized via the flow of ozone atmosphere through the ozone ports), in order to maintain a consistent ozone environment within the chamber and to keep out the prevailing atmospheric conditions (low ozone concentrations).

A plurality of ozone ports (130) and baffles (140) are located within the decontamination chamber (170). In the embodiments depicted in the Figures the decontamination chamber (170) comprises a 1:1 association of ozone ports (130) and baffles (140), however this 1:1 ratio is not required. Accordingly, embodiments contemplated herein include those wherein the plurality of ozone ports (130) are greater in number than the plurality of baffles (140) as well as those wherein the plurality of ozone ports (130) are less in number than the plurality of baffles (140). While depicted in the Figures as a general grid, the arrangement of the ozone ports and the baffles within the decontamination chamber are not limited by any particular pattern. The arrangement can be adjusted and modified as may be suitable or required by the geometry of the decontamination chamber, or the ozonation system itself. Suitably however, and particularly when the ozone ports and the baffles are included in a ratio of 1:1 or about 1:1, the ozone ports and baffles are arranged within the decontamination chamber such that the grain flow path through the chamber is diverted and directed toward another ozone port/baffle combination at a location lower in the chamber (causing grain deflection), and providing a cascading grain flow path and grain "curtain" formation as the grain moves downward in the chamber after interacting (e.g., deflecting) with the baffle(s).

Figure 1B:
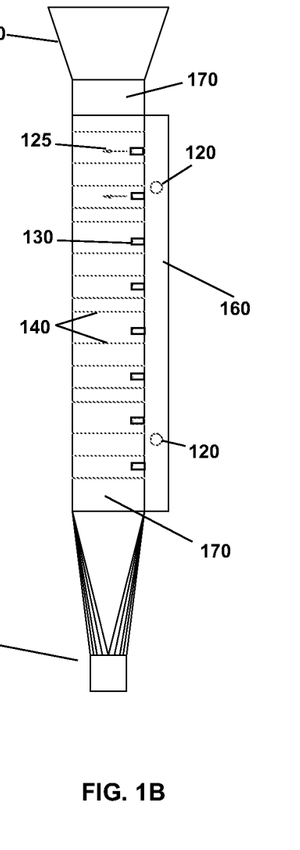
FIG. 1B illustrates a side view of the ozonation system 100.
Figure 2A:
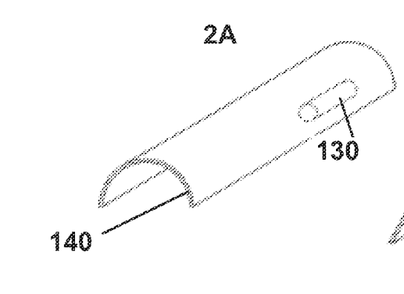
FIGS. 2A, 2B, and 2C depict non-limiting embodiments of ozone port 130 and baffle 140 arrangements.
Figures 2B, 2C:
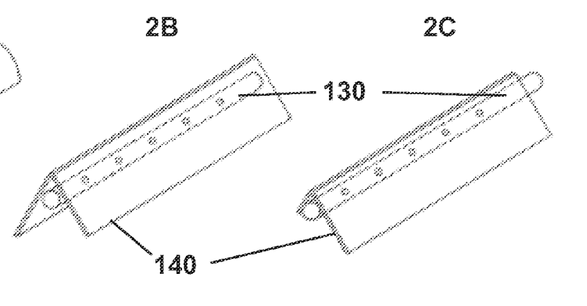
Figure 2D:
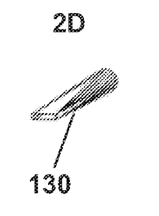
FIG. 2D depicts a non-limiting embodiment of an ozone port 130.
Figure 2E:
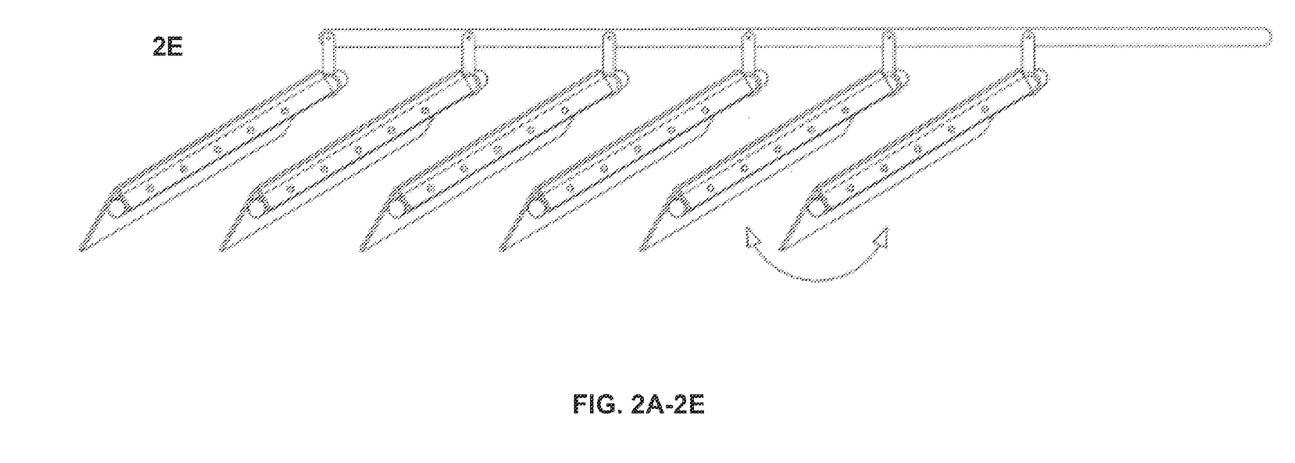
FIG. 2E depicts an embodiment of adjustable baffles, where baffle angle can be optionally adjusted for an individual baffle 140 or a series of baffles.
Figure 2F:
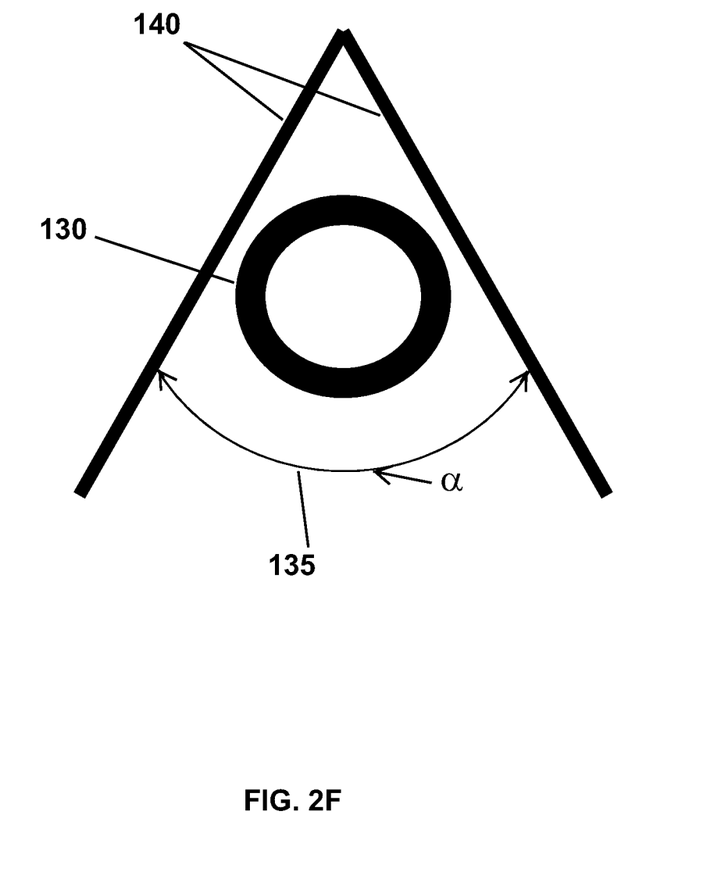
FIG. 2F is an expanded view of an arrangement of the ozone port 130 and baffles 140. The baffles 140 are located above the ozone port 130, and form an angle ($\alpha$) 135 that can be adjusted in some embodiments as described below.

FIG. 2F depicts a non-limiting embodiment of an arrangement of an ozone port (130) and baffle (140). In that figure, the ozone port (130) is located underneath the baffle (140) such that the ozone port is not in the direct flow path of the grain moving through the decontamination chamber (i.e., referring to embodiments depicted in FIGS. 1A-1B; 2A-C, 2E-F; and 3A-C the baffle (140) can prevent direct contact between the grain flow path (125) and the ozone port (130)). While several Figures illustrate a circular ozone port, the shape of the ozone port is not limited to a circular shape, or any other particular shape. For example, one of the many alternative and non-limiting shapes that may be employed for the ozone port is the rounded port that includes a flattened ozone exit point, shown in FIG. 2D. The ozone port is also not limited by any particular size constraints, however in some embodiments the ozone port (130) is sized to fit underneath a baffle (140). As discussed herein and as represented in the Figures, the ozone ports can vary in length, anywhere from being flush with the wall of the decontamination chamber, providing an opening in the wall of the decontamination chamber through which ozone can flow, to the entire depth of the decontamination chamber, optionally providing a plurality of outlets/holes along the length of the port through which ozone may flow.

Referring to the Figures and the non-limiting depictions of the baffles (140), the baffles typically have an orientation and shape that allow for deflection of the grain that moves into and passes through the decontamination chamber. In some illustrative embodiments, the baffles may have a generally inverted-V shape (with respect to the bottom of the decontamination chamber (170)), with substantially equally sized sides, however alternative configurations of the baffles are contemplated herein. For example, in some embodiments the baffles may have any curved, linear, or combined curved and linear shape that allows for the cascading flow path of grain passing through the decontamination chamber. See, e.g., FIGS. 2A and 3A. Other non-limiting baffle embodiments can include inverted-U shapes, inverted-L shapes (e.g., FIGS. 2C, 2E, 3C), arcs, arches, single line shapes (e.g., "/" and/or "\"), or any shape that can divert and deflect the flow of grain. In some embodiments, the baffle may have a shape that forms a type of baffle angle, a, depicted as (135) in the embodiment illustrated in FIG. 2F and shown in an alternative embodiment in FIG. 2E (wherein multiple baffles optionally can be adjusted together). Referring to FIG. 2F, the baffle angle (135) can be adjusted to impede and/or direct the grain flow as may be required based on the type of grain or grain product being decontaminated. For example, it may be desirable to increase the amount of time that the grain resides within the decontamination chamber, and as such, increasing the baffle angle (a larger baffle angle) may allow for slower flow and retain the grain in the chamber for a longer period of time. Similarly heavier or finer grains may benefit from a baffle increasing the baffle angle, relative to an angle for lighter grains, in order to adequately create the desirable cascade type grain flow within the chamber. Similarly, a smaller baffle angle (decreasing the baffle angle) may allow for faster flow and decrease the amount of time the grain is in the chamber. Even further, the pattern and/or total number of baffles contained within the decontamination chamber may allow for an increase or decrease in the baffle angle, in order to create the cascading flow of grain, and also allow for adequate reacting of the grain with the ozone. Accordingly, in some embodiments, the baffle angle is from about 20 degrees to about 170 degrees, about 30 degrees to about 120 degrees, or about 45 degrees to about 90 degrees. In some embodiments the baffles are arranged so that the baffle angle associated with each baffle is independently adjustable. In such embodiments, a user or operator can adjust the baffle angle prior to, after, or during the operation of the unit. In other embodiments the baffles are arranged so that all the baffle angles associated with each baffle are adjustable by a single baffle angle adjustment (refer to the non-limiting embodiment depicted in FIG. 2E). Such embodiments can comprise the use of a slidebar that is connected to a plurality of the baffles and allows for a uniform change in baffle angle by making a single adjustment. FIG. 2E.

Figure 1C:
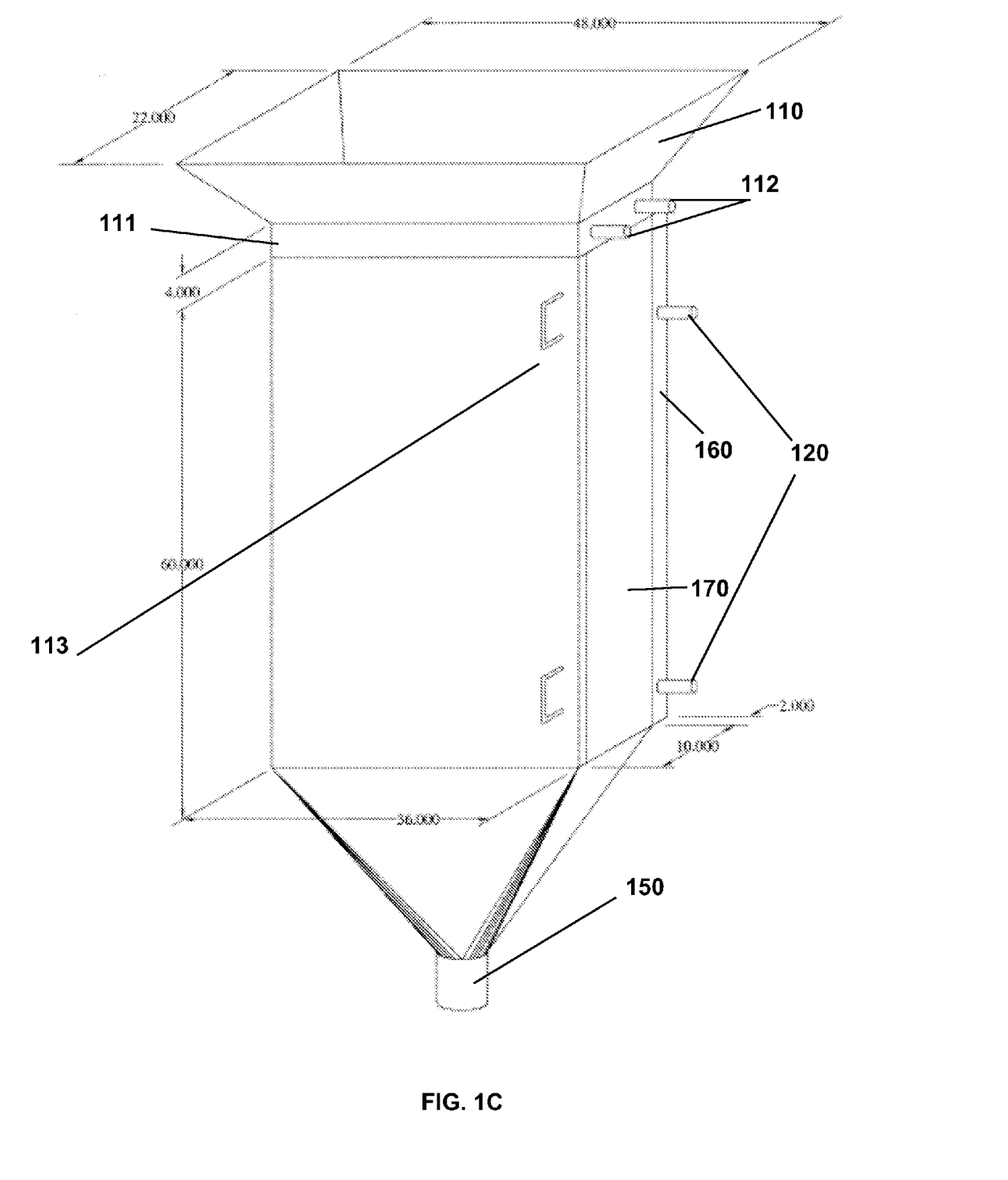
FIG. 1C illustrates a non-limiting embodiment of an ozonation that includes relative dimensions (in inches).
Figure 1D:
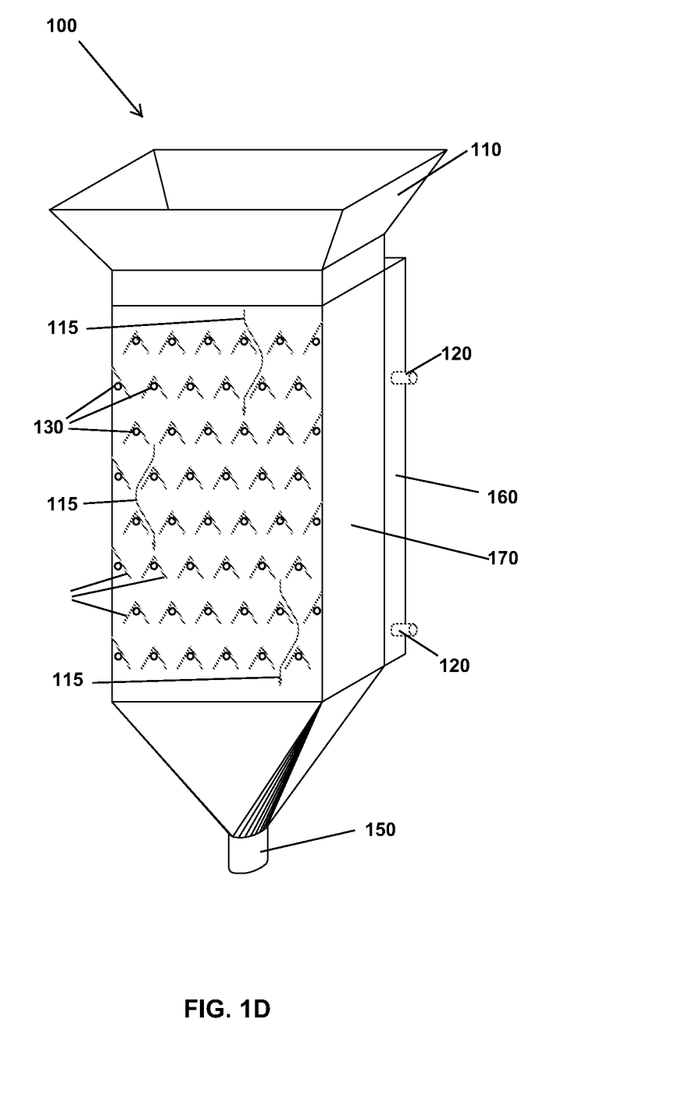
FIG. 1D depicts a perspective view of the non-limiting embodiment of an ozonation system of FIGS.

In some embodiments, the baffles (140) span or substantially span the depth of the decontamination chamber (170), (e.g., see FIG. 1B). As depicted in the embodiments in the Figures, the baffles (140) can be arranged in a substantially regular grid pattern, however they are not required to have such a pattern.

The ozonation system may comprise an ozone chamber (160). In some embodiments, the ozonation system (100) does not comprise an ozone chamber (160). In such embodiments, the plurality of ozone ports (130) may be in direct communication with an ozone source, which bypasses the need for an ozone chamber (160). Nevertheless, it may provide advantageous or convenient to including an ozone chamber (160) in the unit for purposes of increased control of the ozone flow rate and/or ozone concentration in the decontamination chamber (170). In further embodiments, the ozonation system (100) may further comprise an ozone recovery and recycling system that would direct any ozone leaving the unit (e.g., through the hopper (110) or the outlet (150)) into the ozone chamber (160) for reuse. Further, embodiments that comprise such an ozone recovery and recycling system can provide additional advantages such as, for example, reducing costs associated with ozone loss and avoiding any environmental concerns regarding the release of ozone to the environment.

As discussed above, the Figures depict non-limiting embodiments of ozone chambers (160) which comprises at least one or more ozone supply inlet (120) that provides ozone to the ozone chamber (160) from an ozone source (not shown). In some embodiments, the ozone supply inlet may be located near the top of the ozone chamber, as the density of ozone is typically greater than that of air density. In some embodiments, the ozone chamber can comprise two or more ozone supply inlets, which may be used to increase the partial pressure of ozone in the ozone chamber (160) and/or the decontamination chamber (170). The ozone chamber (160) may provide ozone to the decontamination chamber through passive fluid movement (e.g., passive diffusion), or it can be directed or pumped to the decontamination chamber using any convenient method such as, for example, pumps, diffusers, fans, blowers, and the like. In the embodiments illustrated in the Figures, the ozone chamber (160), abuts and is adjacent to the decontamination chamber (170). In such embodiments, the ozone chamber (160) has substantially the same height and width dimensions as the decontamination chamber (170). Further the embodiments in the Figures depict the individual ozone ports (130) in direct connection with the ozone chamber (160). However, the ozone chamber (160) is not required to be of the same dimension as the decontamination chamber and is also not required to abut, be adjacent, or in direct communication with to the decontamination chamber. In some embodiments, the ozone chamber, if present, is in direct communication with the plurality of ozone ports (130). Direct communication may encompass any fluidic connection such as, for example, through a hole, opening, or aperture; as well as through piping, tubing, mixing chambers, and the like. In some embodiments, the ozone chamber and the decontamination chamber may comprise a common wall, or two walls that abut to each other, which comprise a plurality of holes that comprise the ozone ports (130). In some embodiments, the ozonation system may comprise a free-standing ozone chamber (160) that is connected to the plurality of ozone ports (130) through a plurality of connections that comprise tubing, for example. In such embodiments, the connections (e.g., PTFE tubing) are preferably chemically inert to ozone (e.g., the material is not oxidized by ozone, see e.g., above for non-limiting examples).

The amount or concentration of ozone within the decontamination can be adjusted as needed, however it will be limited by the capacity of the ozone generating unit. In some embodiments, the amount of ozone in the decontamination chamber is anywhere from 0.005% (i.e., 50 ppm) to about 15%. Effective amounts of ozone may vary depending on the particular residence time within the decontamination unit as well as the particular contaminant to be removed (i.e., whether an insect, mold, fungus, or toxin). Ozone can be used in amounts ranging from 50 ppm to 200 ppm which has been shown to effectively fumigate grains in storage (e.g., grain silos), or higher (e.g., from about 200 ppm-1000 ppm) in situations wherein reacting and processing time needs to be reduces. As such, and in order to reduce the amounts of time, higher levels of ozone may be used within the decontamination chamber. The amount of ozone can be determined using any type of ozone detector or monitor located within the unit (e.g., in the decontamination chamber and/or the ozone chamber). An external air supply can be used to adjust the concentration of ozone, and may be mixed with the ozone either prior to or during the introduction of the ozone into the decontamination chamber via the ozone ports. The ozonation system may further comprise an ozone recover and recycling system (e.g., vacuum/forced air system) that can be used to reclaim ozone from outside the inlet or outlet of the unit, and direct it back into the system.

Methods

In other aspects, the disclosure provides a method for decontaminating grain comprising introducing grain into an atmosphere comprising ozone and reacting grain with ozone, wherein the ozone in provided in an amount effective to oxygenate and decontaminate the grain, and the grain moves through the atmosphere in a gravity-driven flow path. In embodiments, the method may expedite or increase grain assurance efficiencies, wherein the method is sufficient to decontaminate grain of insects, insect eggs, bacteria, fungi, and related contaminants, particularly relating to embodiments relating to grain that has been stored or is in storage containers. The method can also comprise one or more known pretreatment steps, including washing steps, blanching steps, drying steps, heat treatment steps, hulling steps, milling steps, and the like. The method may be performed on grain that is dry and flowable. If the method comprises any pretreatment steps that increase the moisture content of the grain, a further pretreatment drying step may be used to reduce the moisture content such that the grain is flowable.

The method comprises reacting the grain with ozone (e.g., contacting grain with ozone) while the grain is moving in a gravity-driven (or gravity-assisted) flow path. As discussed herein, the method possesses advantages relative to prior grain decontamination methods that comprise ozone. In the method, the grain is contacted with ozone by passing the grain through an atmosphere comprising ozone, wherein the grain is substantially continuously moving in a gravity-driven flow path. The method provides for improved contact and reaction between the grain and ozone, such that substantially all of the surface area of the grain is contacted and decontaminated. Thus, methods encompassed by the disclosure comprise the use of ozonation systems as described herein that are effective to provide adequate volume and time that allows for sufficient exposure of grain with the ozone in the decontamination chamber.

Embodiments of the method provide a treated grain that may not require further processing, decontamination, or purification. The method may also be used to preserve grains, such as high-value seeds.

Suitably, the decontamination method comprises use of the ozonation system described herein. As such, the effective amount of ozone employed in the method can depend on a variety of parameters. Methods comprising an insufficient ozone concentration can result in higher levels of contaminants in the resulting grain product and thus, a lower grade of grain. Accordingly, while it may be desirable to perform the method with a reacting step that comprises an excess amount of ozone (for improved decontamination), such a step can lead to increased processing costs. Accordingly, in embodiments that comprise reacting the grain with an excess amount of ozone, the ozonation system (or method) can include an optional recycling system (or step) that recovers and recirculates the excess ozone back through the ozonation system for further application to grain that is to be treated. Alternatively, or in addition, the method can comprise a step that repeats the method by directing the treated grain from the first decontamination method, to a second ozonation system, or optionally cycle back to the top of the ozonation system used in the first decontamination method.

As discussed above, in some embodiments the amount of ozone effective to decontaminate grain is from about 50-200 ppm or, alternatively, from about 0.1 to 1 parts of ozone per 100 parts grain (v/w). The method may be performed at or near ambient temperature, and at pressures slightly above atmospheric pressure. Any residual unreacted ozone may dissipate either through passive or active diffusion (air exchangers, fans, etc.) or degradation to diatomic oxygen.

I claim:

1. An ozonation system comprising:
 a grain inlet configured to accept grain;
 a decontamination chamber connected to the grain inlet and comprising:
   a plurality of baffles that are each configured to divert a gravity-driven flow path of grain flowing from the grain inlet into and through the decontamination chamber, wherein the plurality of baffles each comprise an inverted-V shape with respect to a bottom of the decontamination chamber and have a baffle angle (α); and
   at least one ozone port configured to provide ozone to the decontamination chamber, wherein the at least one ozone Dort is located directly underneath one of the plurality of baffles, and wherein ozone flows through the at least one ozone port directly into the decontamination chamber; and
 a grain outlet.

2. The ozonation system of claim 1, further comprising an ozone generator, wherein the ozone generator is in communication with the at least one ozone port.

3. The ozonation system of claim 1, further comprising an ozone chamber, wherein the ozone chamber is in communication with the at least one ozone port.

4. The ozonation system of claim 3, further comprising an ozone generator, wherein the ozone generator is in communication with the ozone chamber.

5. The ozonation system of claim 1, wherein the plurality of baffles and a plurality of the at least one ozone port are present in a ratio of about 1:1.

6. The ozonation system of claim 1, wherein each of a plurality of the at least one ozone port and each of the plurality of baffles are located such that each ozone port is not in a direct flow path of grain moving through the decontamination chamber.

7. The ozonation system of claim 1, wherein the baffle angle (α) is adjustable.

8. The ozonation system of claim 1, wherein the plurality of baffles comprise a grid.

9. The ozonation system of claim 1, wherein the ozonation system further comprises one or more ozone detectors.

10. The ozonation system of claim 1, wherein the ozonation system further comprises an ozone recycling system.

11. The ozonation system of claim 1, wherein the ozonation system further comprises one or more fans or directional blowers configured to direct at least a portion of a grain flow path in the decontamination chamber.

12. A method for decontaminating grain, the method comprising:
 introducing grain into a decontamination zone comprising ozone; and
 reacting grain with ozone in the decontamination zone; wherein:
   an amount of ozone in the decontamination zone is effective to decontaminate the grain;
   the grain moves through a decontamination zone atmosphere in a gravity-driven flow path;
   as the grain moves through the decontamination zone, it is deflected by a plurality of baffles, wherein the plurality of baffles each comprise an inverted-V shape and have a baffle angle (α); and
   the ozone is introduced into the decontamination zone atmosphere through at least one ozone port located directly underneath one of the plurality of baffles.

13. The method of claim 12, wherein the baffle angle (α) is adjustable.

14. An ozonation system comprising:
 a grain inlet configured to accept grain;
 a decontamination chamber connected to the grain inlet and comprising:
   a plurality of baffles that are each configured to divert a gravity-driven flow path of grain flowing from the grain inlet into and through the decontamination chamber, wherein the plurality of baffles each comprise an inverted-U shape with respect to a bottom of the decontamination chamber; and at least one ozone port configured to provide ozone to the decontamination chamber, wherein the at least one ozone port is located directly underneath one of the plurality of baffles, and wherein ozone flows through the at least one ozone port directly into the decontamination chamber; and a grain outlet.

15. The ozonation system of claim 14, wherein each of a plurality of the at least one ozone port and each of the plurality of baffles are located such that each ozone port is not in a direct flow path of grain moving through the decontamination chamber.

16. The ozonation system of claim 14, wherein the ozonation system further comprises an ozone recycling system.

17. The ozonation system of claim 14, wherein the ozonation system further comprises one or more fans or directional blowers configured to direct at least a portion of a grain flow path in the decontamination chamber.

* * * * *